United States Patent Office 3,621,709
Patented Nov. 23, 1971

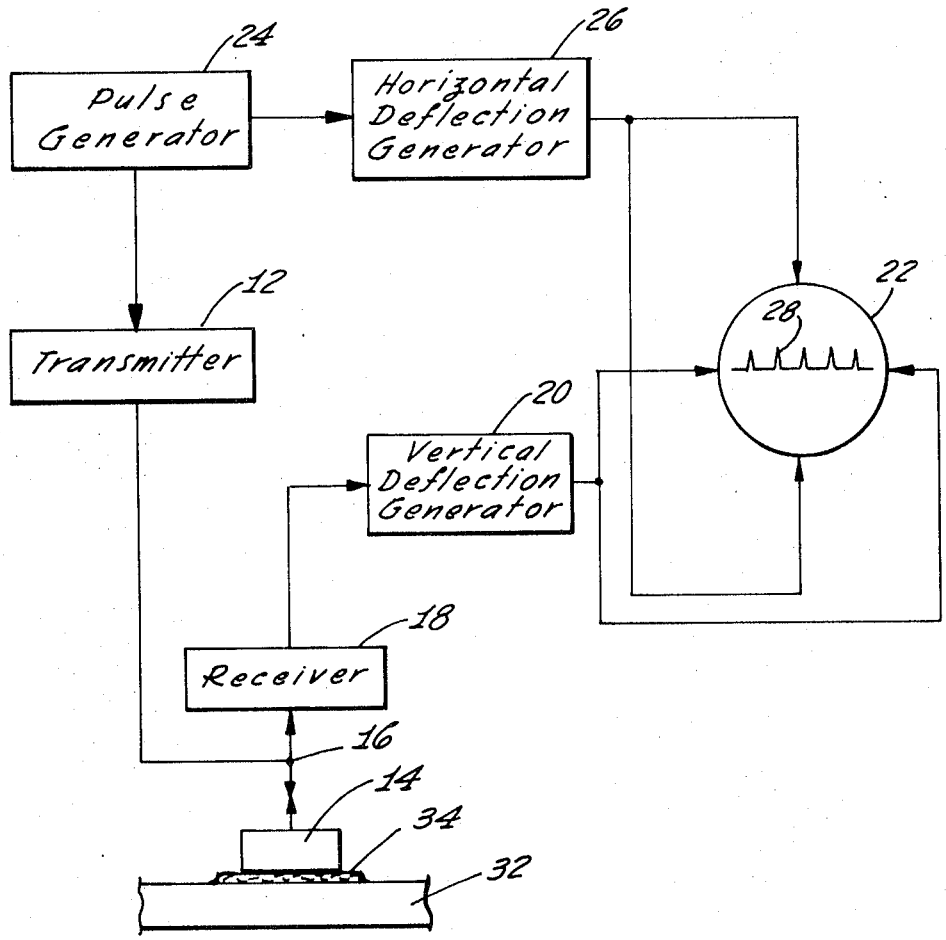

3,621,709
ULTRASONIC COUPLANT
Albert E. Frey, Danbury, Conn., assignor to Automation Industries, Inc., Los Angeles, Calif.
Filed Jan. 28, 1969, Ser. No. 794,715
Int. Cl. G01n 29/04
U.S. Cl. 73—71.5      8 Claims

ABSTRACT OF THE DISCLOSURE

A couplant of ultrasonic material testers is described which includes a mixture comprised of borax and glycerin.

BACKGROUND OF THE INVENTION (A) Field of the invention

This invention relates to ultrasonic nondestructive testers and more particularly to a couplant material for acoustical coupling between the ultrasonic tester and the workpiece or the like.

(B) Description of the prior art

In the prior art there is provided electrical nondestructive test equipment which generates ultrasonic vibrations by use of crystal transducer. The vibrations for the transducer are then sent in the form of an acoustical pulse beam into the workpiece being tested. The beam travels unimpeded through large metallic parts and reflects back from the end surfaces thereof. Any flaw, defect or other discontinuity in the workpiece also causes reflections of the acoustical beam back to the instrument which indicates the location and size of discontinuity on a display such as an oscilloscope. The search unit need have only access to one side of the workpiece being tested. The pulse high frequency vibration is projected from the search unit into the workpiece. A portion of the pulse is reflected back by the flaw or defect and the balance is reflected from the end surfaces. The return energy is displayd on the oscilloscope as vertical spikes. The screen on the oscilloscope exhibits electrical waveforms in the form of spikes of the initial pulse, the defect, and the back and front surface reflections. Spacing of the spike on the scope is in proportion to the distance the beam traveled in the material tested, thus locating the position of any flaw by irregular spaced spikes.

Also, such a tester is used to determine the thickness of the workpiece by the regularity of the return back and front surface spikes. If any discrepancies appear in the thickness it is detected by the relative change in the spikes displayed on the scope.

In order to obtain acoustical coupling between the search unit and the transducer a liquid couplant in the form of water or glycerin has heretofore been used. The use of this couplant is necessary because of the fact that air greatly attenuates acoustical sound waves.

It has been found, though, that the prior art couplants are not sufficient, especially when used on workpieces which are in a vertical position or when the bottom side of a stationary workpiece is to be tested. Present couplants now used are comprised generally of an oily substance which readily disperses and thus causes loss in signal transmission. Further, there are times when couplants which adhere to surfaces quite readily, such as oil, cannot be used on some specimens as it will contaminate the surface to be tested. Therefore a need has arisen for a couplant which is water soluble and thus easily cleaned from the workpiece under test. Further, it is desirous to provide a couplant that will not run, drip or spread when used in higher temperature environments. A further requirement desired in a couplant is one which is especially useful for inspection of rough, corroded and pitted surfaces.

SUMMARY OF THE INVENTION

Briefly described, the present invention comprises a couplant used between the search unit of an ultrasonic tester and a workpiece, for example, which is comprised of a mixture of borax and glycerin. The mixture of the boron and glycerin is cured under different temperature ranges to provide for different viscosities thereof.

A feature of the present invention is that the mixture provided thereby is a water soluble opaque jelly which is applied directly to the test material or to the search unit.

Another feature is that a couplant provided by the present invention will not run, drip or spread when used in higher temperature environments. Further, such a mixture will not run down vertical surfaces during testing thereof. Another feature is that the couplant in accordance with the principles of this invention provides good sound penetration into the workpiece under test.

Another feature of this invention is that the couplant provided in accordance therewith will withstand very high temperature ranges and sometimes to the order to 700° to 950° under certain circumstances and still not spread or disperse.

DESCRIPTION OF THE DRAWINGS

These and other features and advantages will become apparent to those skilled in the art when taken into consideration with the following drawing which shows a block diagram of an ultrasonic nondestructive test unit using the couplant in accordance with this invention, wherein like reference numerals indicate like and corresponding parts throughout the single view.

DESCRIPTION OF ONE PREFERRED EMBODIMENT

Turning now to the drawing, there is shown a nondestructive test instrument 10, which includes a transmitter 12, which produces a series of intermittently occurring high voltage, high frequency pulses. The transmitter 12 is coupled to a search unit 14 by the cable 16. The search unit 14 includes an ultrasonic transducer therein. Pulses emitted by the transmitter 12 excite the transducer in the search unit 14 whereby a corresponding pulse of ultrasonic energy is transmitted therefrom.

Echoes from the pulses are received by the transducer in the search unit 14 whereby a similar electrical signal is produced therefrom. This electrical signal is returned by the cable 16 to a receiver 18. The receiver 18 is coupled to a vertical deflection generator 20, which in turn in coupled to an oscilloscope 22. The transmitter 12 is driven by pulse generator 24, which also drives a horizontal deflection generator 26. The horizontal deflection generator 26 and the vertical deflection generator 20 drive the oscilloscope 22.

The results of the output of the receiver 18 and the horizontal deflection generator 26 are displayed in a display 28 on the face of the oscilloscope 22. The screen of the oscilloscope 22 reflects the return energy in the form of spikes of the initial pulse. Also shown are spikes indicative of the defects and back reflections from the material under test. Spacing of the spikes is in proportion to the distance of the material tested. Any random spike which appears between the initial spacing is indicative of flaws, defects or other discontinuities in the workpiece being tested. Thus the location of these flaws is identifiable by the random spikes between the initial return spikes.

The search unit 14 directs the beams of ultrasonic energy from the transducer contained therein in a preferred direction into a workpiece 32. A liquid couplant 34 is positioned between the search unit 14 and the workpiece 32 to provide for acoustical coupling therebetween.

The coupling 34 is comprised, for one example, of 50 to 100 parts borax to 100 parts of glycerin by weight. The glycerin is provided in a suitable tank and to this is added, with good agitation, a sufficient amount of granular borax. For a specific example of a preferred mixture, 228 pounds of 96% USP glycerin by volume may be used with 172 pounds of granular borax (technical grade). This mixture is heated to a range between 230° F. to 250° F. and kept at this selected temperature for the time specified, depending on the final viscosity of the material desired. For example, if a heavy viscosity is desired, boiling may take place for one hour and fifty minutes to two hours. For medium viscosity, boiling may be from one hour fifteen minutes ± five minutes, and for a light viscosity, boil for fifty minutes ± five minutes. The solution, while hot, is then filtered into appropriate containers. The final couplants provided by the method will have a viscosity as measured with a #4 Zahn viscometer of the following approximate values: heavy viscosity 40+3 Zahn seconds at 190+20 F.; medium viscosity is 40+3 Zahn seconds +2° F.; and light viscosity will be 28+3 Zahn secfifteen minutes ± five minutes, and for a light viscosity, boil for fifty miuntes ± five minutes. The solution, while hot, is then filtered into appropriate containers. The final couplants provided by this method will have a viscosity as measured with a #4 Zahn viscometer of the following approximate values: heavy viscosity 40+3 Zahn seconds at 190+2° F.; medium viscosity is 40+3 Zahn seconds+2° F.; and light viscosity will be 28+3 Zahn seconds at 150°+2° F. By visual inspection of the finished couplant, the material should appear as clear.

It has been found that such a couplant can be used up to 700° F. temperature range. However, if it were to be used in an oven with a closed atmosphere condition, the flashpoint would be approximately 950° F. The light viscosity ultrasonic couplant in accordance with this invention, may be used within an approximate temperature range from 0° to 300° F.; while the heavy viscosity couplant can be used within an approximate temperature range from 0° to 700° F.

To select the couplant with the correct viscosity, the following conditions may be considered: first, that the temperature range limitation of both the material and search unit be used; second, the surface condition of the test piece should be considered. When testing a rough surface, the surface condition rather than the temperature range may dictate selection of a heavy or a medium viscosity grade. Thirdly, heavy viscosity couplant is recommended for coupling of direct shear mode search units. A couplant made in accordance with the principles of this invention may have efficiency to about the order of ten times that of any previously available couplant.

Such a couplant as provided in accordance with this invention is nontoxic, noncombustible and is chemically inert to all color materials including ferrous and alloys, ceramics and base materials, and the couplant residue is easily removed with a cloth dampened with water.

Having thus described one preferred embodiment of this invention, what is claimed is:

1. An ultrasonic couplant material comprised of a mixture of borax and glycerin.

2. The ultrasonic couplant material as defined in claim 1, wherein said mixture being comprised of approximately 50 to 100 parts of borax to 100 parts glycerin.

3. The method of preparing an ultrasonic couplant comprising the steps of:

providing a predetermined amount of glycerin and borax;

heating the mixture for a predetermined time.

4. The method as defined in claim 3 and further including the step of agitating the borax and glycerin during their mixture.

5. The method as defined in claim 3 wherein said mixture being comprised of approximately 50 to 100 parts of borax to 100 parts glycerin.

6. The method as defined in claim 5 wherein said mixture being heated at approximately 230° F. to 250° F. for approximately one to two hours depending upon the desired viscosity.

7. The method of preparing an ultrasonic couplant including the steps of:

providing a mixture of a predetermined amount of borax and glycerin; and heating the mixture at a temperature range of approximately 230°–250° F. for a predetermined time.

8. The method as defined in claim 7, and further including the step of agitating the borax and glycerin during the mixture thereof.

References Cited

UNITED STATES PATENTS

| 2,398,701 | 4/1946 | Firestone | 73—67.9 |
| 3,354,699 | 11/1967 | Carnevale et al. | 73—67.5 |
| 3,393,331 | 7/1968 | Puckett | 73—67.9 X |

RICHARD C. QUEISSER, Primary Examiner

J. P. BEAUCHAMP, Assistant Exaimner

U.S. Cl. X.R.

310—8.7